(12) United States Patent
Fleytman et al.

(10) Patent No.: US 6,514,167 B1
(45) Date of Patent: *Feb. 4, 2003

(54) CONTINUOUSLY VARIABLE TRANSMISSION

(75) Inventors: Yakov Fleytman, Orion, MI (US); Charles E. Beyer, Rochester, MI (US); Philip J. Francis, Lapeer, MI (US)

(73) Assignee: New Venture Gear, Inc., Troy, MI (US)

( * ) Notice: Subject to any disclaimer, the term of this patent is extended or adjusted under 35 U.S.C. 154(b) by 10 days.

This patent is subject to a terminal disclaimer.

(21) Appl. No.: 09/685,402

(22) Filed: Oct. 10, 2000

Related U.S. Application Data

(60) Provisional application No. 60/159,892, filed on Oct. 15, 1999.

(51) Int. Cl.[7] ............................. F16H 37/08; F16H 3/72
(52) U.S. Cl. ......................... 475/201; 475/5; 475/150; 475/204; 475/212
(58) Field of Search ............................ 475/5, 7, 150, 475/151, 153, 201, 204, 205, 210, 211, 212, 216, 218; 74/665 GE; 180/247, 248

(56) References Cited

U.S. PATENT DOCUMENTS

| | | | |
|---|---|---|---|
| 548,860 A | 10/1895 | Ames | |
| 1,903,318 A | 4/1933 | Wildhaber | |
| 1,980,237 A | 11/1934 | Trbojevich | |
| 3,220,284 A | 11/1965 | Horvath | |
| 3,535,948 A | 10/1970 | Winzeler | |
| 3,597,990 A | 8/1971 | McCartin | |
| 3,711,910 A | 1/1973 | Strejc | |
| 3,875,635 A | 4/1975 | Pavlov et al. | |
| 3,895,700 A | 7/1975 | Kerr | |
| 3,977,632 A | 8/1976 | Walson | |
| 4,031,780 A | * 6/1977 | Dolan et al. | 180/248 |
| 4,047,449 A | 9/1977 | Popov | |
| RE31,361 E | * 8/1983 | Smirl | 475/205 |
| 4,489,625 A | 12/1984 | White | |
| 4,627,308 A | * 12/1986 | Moroto et al. | 475/205 |

(List continued on next page.)

FOREIGN PATENT DOCUMENTS

| | | |
|---|---|---|
| DE | 2415859 | 10/1975 |
| DE | 3435219 A1 | 5/1985 |
| DE | 3428865 C1 | 9/1985 |
| FR | 2341787 | 9/1977 |

*Primary Examiner*—Charles A. Marmor
*Assistant Examiner*—Ha Ho
(74) *Attorney, Agent, or Firm*—Harness, Dickey & Pierce P.L.C.

(57) ABSTRACT

A four-wheel drive transmission is provided which combines a continuously variable transmission unit and a transfer case into a common assembly. The four-wheel drive transmission includes a continuously variable transmission unit, a drive selector unit and a torque transfer unit. Variable speed control of a worm/worm gear transmission drives a component of a differential associated with the continuously variable transmission unit to provide continuous ratio control between an input shaft and an intermediate shaft. The drive selector units establishes forward and reverse drive connections between the intermediate shaft and a first output shaft. Finally, the torque transfer unit controls the selective/automatic transfer of drive torque from the first output shaft to a second output shaft to provide four-wheel drive operation.

20 Claims, 15 Drawing Sheets

U.S. PATENT DOCUMENTS

| | | |
|---|---|---|
| 4,632,337 A | 12/1986 | Moore |
| 4,685,346 A | 8/1987 | Brackett |
| 4,697,476 A | 10/1987 | Maxwell |
| 4,783,023 A | 11/1988 | Jupe |
| 4,907,672 A | 3/1990 | Muzzarelli |
| 4,973,295 A | 11/1990 | Lee |
| 4,998,385 A | 3/1991 | Umezono et al. |
| 5,015,898 A | 5/1991 | Frey |
| 5,018,403 A | 5/1991 | Umezono et al. |
| 5,033,996 A | 7/1991 | Frey |
| 5,081,885 A | 1/1992 | Shaffer |
| 5,265,488 A | 11/1993 | Yang |
| 5,353,889 A | 10/1994 | Hamada |
| 5,443,429 A * | 8/1995 | Baxter, Jr. ................... 475/204 |
| 5,609,219 A * | 3/1997 | Watson et al. .............. 180/197 |
| 5,647,790 A | 7/1997 | Horiutchi |
| 5,890,987 A * | 4/1999 | Lamers ....................... 475/210 |
| 5,988,006 A | 11/1999 | Fleytman |
| 5,992,259 A | 11/1999 | Fleytman |
| 6,001,041 A * | 12/1999 | Sawase et al. .............. 180/248 |
| 6,074,322 A | 6/2000 | Fleytman |
| 6,093,126 A | 7/2000 | Fleytman |
| 6,098,480 A | 8/2000 | Fleytman |
| 6,142,905 A * | 11/2000 | Brown et al. ................ 180/248 |
| 6,148,683 A | 11/2000 | Fleytman |

\* cited by examiner

CONTINUOUSLY VARIABLE TRANSMISSION

This application claims the benefit of provisional application Serial No. 60/159,892 filed Oct. 15, 1999.

FIELD OF THE INVENTION

The present invention relates generally to continuously variable transmissions for motor vehicles, and more particularly, to a four-wheel drive continuously variable transmission.

BACKGROUND OF THE INVENTION

In general, power transfer mechanisms, such as transfer cases, are operative for selectively directing power to the non-driven wheels of a motor vehicle for establishing four-wheel drive modes. Many automotive transfer cases are equipped with a speed reduction gear assembly for providing "high" and "low" speed ranges in conjunction with two and four-wheel drive modes. As such, a range shift mechanism is provided for operatively shifting components of the speed reduction gear assembly between a high range position providing a direct ratio drive connection and a low range position providing a reduction ratio drive connection.

Conventionally, transfer cases are provided in combination with standard automatic and manual transmissions. However, conventional automatic and manual transmissions are heavy and contribute greatly to the weight of the vehicle and are only capable of establishing discrete gear ratios. Furthermore, automatic transmissions are inefficient due to the requirement that the hydraulic system utilized for controlling the sequential shifting of the automatic transmission requires a large amount of power in order to maintain the hydraulic fluid pressure even when shifting is not necessary. Thus, it would be desirable in the art of automotive transmissions to provide a four-wheel drive transmission which has improved efficiency, a continuously variable operating range, and reduced size and weight.

SUMMARY OF THE INVENTION

Accordingly, it is an object of the present invention to provide a four-wheel drive transmission which combines a continuously variable transmission unit and a transfer case unit into a common assembly.

It is another object of the present invention to provide a four-wheel drive transmission which is lighter in weight and more compact than conventional transmission and transfer case combinations.

It is still another object of the present invention to provide a four-wheel drive transmission which does not require an engine clutch.

A further object is to provide a rear-wheel drive transmission integrating a continuously variable transmission unit and a geared drive selector unit into a common assembly. A related to object is to arrange the continuously variable transmission unit and the geared drive selector unit to provide a front-wheel drive transaxle.

These and other objects of the present invention are obtained by providing a four-wheel drive transmission having a continuously variable transmission unit, a planetary drive selector unit, and a torque transfer unit. The four-wheel drive transmission is further equipped with a worm/worm gear transmission which is controlled by a transmission controller to provide continuous ratio control of the continuously variable transmission unit.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
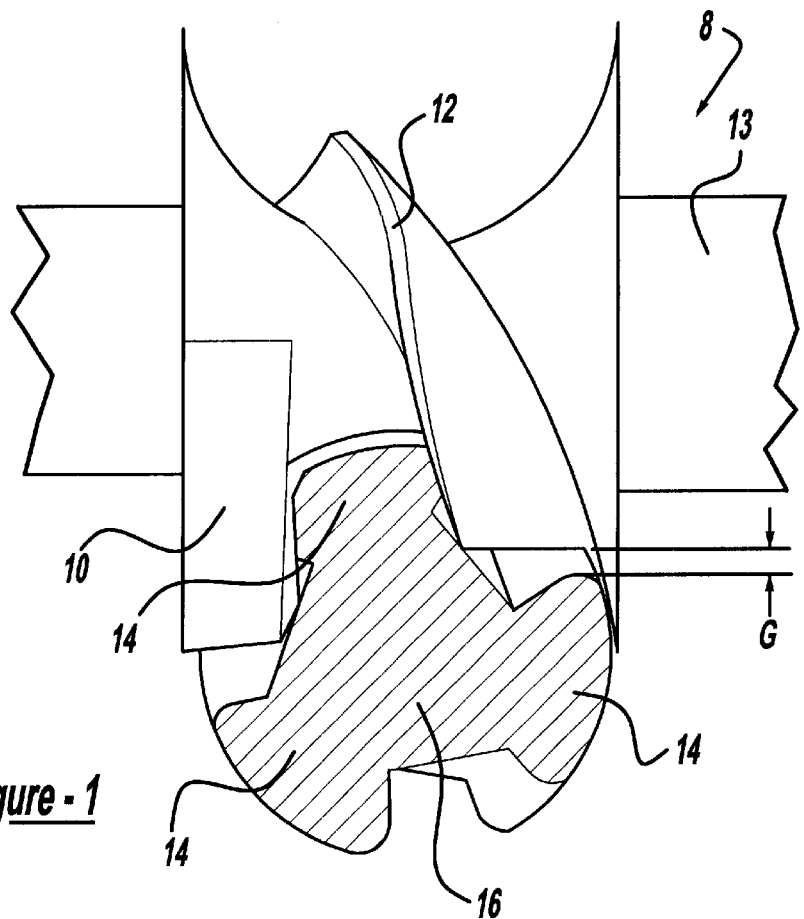
FIG. 1 is a sectional view of a worm/worm gear transmission with the worm gear having three teeth according to the principles of the present invention.

Continuously variable transmissions according to the principles of the present invention will be described below with reference to FIGS. 24 through 26. However, the following discussion relating to FIGS. 1–23 provides a detailed description of the unique enveloping-type worm/worm gear transmission which can be utilized with the present continuously variable transmission of the invention.

The reason for using an enveloping-type worm gear is that this type of worm gear has a natural profile of tooth surface which is distinct from other types of thread followers. The configuration of the worm gear teeth is generated by the profile of the thread or threads of the worm. A computer model simulation is utilized to generated the configuration of the worm gear teeth of the worm gear. The worm gear is then formed using known techniques such as hobbing or casting. When the worm gear teeth are generated by the profile of the threads of the worm having different lengths for the same enveloping angle (shortened), the profiles of the worm teeth is different. The main advantage for using the enveloping-type worm gears is more torque capacity.

The worm thread has a rolling action contract relationship with the teeth of the worm gear which provides an increased efficiency. Furthermore, it is beneficial to have the pitch diameter in the center of the worm gear. With standard worm designs, with more than one thread and a large enveloping angle, the inability to assemble the worm and worm gear was considered a major obstacle. With the worm and worm gear of the present invention, the worm and worm gear are easily assembled by properly orienting the worm thread and worm teeth.

According to the present invention, the greater enveloping angle for one revolution of the worm thread permits the use of worm gear teeth without undercut portions. Enveloping worm/worm gear transmissions with a worm gear having less than twenty-four teeth have not been commercially used because it was believed impossible to build such a transmission due to the need to undercut the root of the worm gear tooth. Thus, those skilled in the art did not consider enveloping type worm gears with less than twenty-four teeth to be feasible for commercial applications. In contrast, the enveloping worm/worm gear transmission of the present invention utilize a worm gear without undercut gear teeth because of a greater enveloping angle for one revolution of the worm thread.

With less than twenty-four gear teeth and a greater enveloping angle for one revolution of the thread, as compared to prior enveloping worm/worm gear transmissions, the minimum ratio for one thread could be reduced to two, with an increase in achieved efficiency, in contrast, prior enveloping worm/worm gear transmissions had a minimum ratio of twenty-four for one thread of the worm and a ratio of five for five threads of the worm. The efficiency of the new worm/worm gear transmission is even greater than that of well-known hypoid gearsets which are used in low ratio right-angle drives. Thus, the present invention can replace hypoid or bevel gearing in many applications by reason of the low ratio. In addition, this new worm/worm gear transmission is able to back drive by transmitting torque from the worm gear to the worm. For the same size, this invention has more than twice the capacity of traditional hypoid gearing.

In this application, it is possible to have "surface to surface" contact between the worm gear teeth and the worm thread, thereby increasing the torque capacity of the enveloping worm/worm gear transmission. This became feasible when the enveloping angle for one revolution of worm thread is equal or greater than 15 degrees. In all standard enveloping worm/worm gear transmissions, only "line" contact is obtained between the thread and worm gear teeth or thread followers. This physical distinction has realized new and unexpected results with regard to the torque capacity of the worm/worm gear transmission of the present invention. The efficiency of the new worm/worm gear transmission is equal or even greater than in well-known hypoid gearing, which are used in right angle drives with low ratio. For back drive, when the worm gear is a driven member and the worm is a driving member, this worm/worm gear transmission also has high efficiency compared to a hypoid gear set.

In accordance with one feature of the present invention, a worm/worm gear transmission is utilized to transmit rotation with the smallest ratio between the worm gear teeth and one worm thread. In the past, it has been believed that at least 24 teeth were required for a worm gear to be used with a double enveloping worm/worm gear combination. However, in the present invention, the big difference from the traditional worm/worm gear is not only in the number of teeth, but also in the enveloping angle of the worm thread, which is used for generation of the profile for the worm gear teeth. This enveloping angle can be as large as 180 degrees for one revolution of the thread when the number of worm gear teeth is only two but is preferably larger than 15 degrees. Further detail of the use of the unique worm/worm gear transmission discussed herein can be found in U.S. Pat. No. 5,992,259 entitled "Worm/Worm Gear Transmission and Apparatus for Transmitting Rotation Utilizing An Oscillating Input" and U.S. application Ser. No. 09/290,911 filed Apr. 12, 1999 titled "Worm/Worm Gear Transmission," both of which are owned by the inventor hereof and which are also expressly incorporated by reference hereto.

In the past, the worm and worm gears have been formed of materials having low coefficients of friction; worm gears typically were made only from bronze. With the present invention however, the worm and worm gear can be made from a high strength material, such as steel. The preferable shape of the teeth and threads for the worm gear and the worm are shown in the drawings, but could be different. Even so, a worker of ordinary skill in the art would recognize that other shapes would come within the scope of this invention.

Referring now to the drawings, one embodiment of a worm/worm gear transmission 8 of the present invention is illustrated in FIG. 1. Transmission 8 has an enveloping type worm 10 with at least one screw thread 12. Enveloping type worm 10 is supported on a shaft 13. Thread 12 is engaged by at least one tooth 14 of an enveloping type worm gear 16, which is shown to have three teeth 14. As shown in FIG. 1, enveloping worm 10 has a single thread 12 in a preferred embodiment and worm gear 16 has three teeth 14 spaced about its circumference. As shown, a gap "G" exists between any tooth on worm gear 16 and thread 12 on enveloping worm 10. Enveloping worm 10 wraps around enveloping worm gear 16, and enveloping worm gear 16 also wraps around enveloping worm 10.

Worm gear 16 and worm 10 are preferably enclosed in a housing (not shown) in FIG. 1. Typically, the housing is made from metal and forms a reservoir for a lubricant to both lubricate and cool the gears, bearings, and seals for the unit. The housing forms a rigid support to mount the gears, bearings, seals and their associated parts (not shown).

Figure 17:
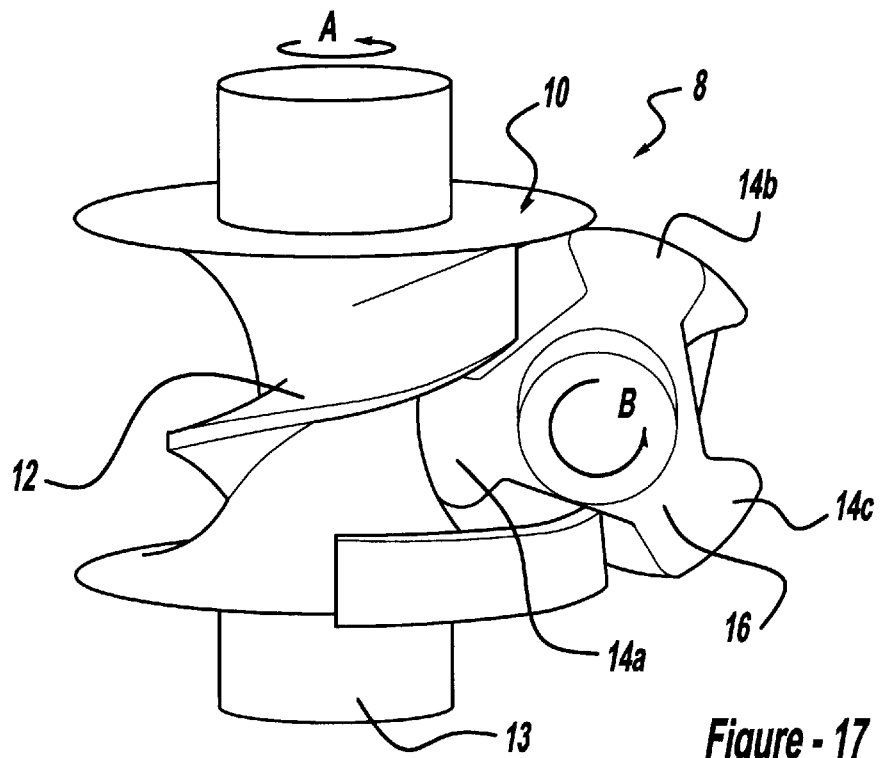
FIG. 17 is a perspective view of the worm/worm gear transmission shown in FIG. 1 with three worm gear teeth.

FIG. 17 is a perspective view corresponding with worm/ worm gear transmission 8 shown in FIG. 1 and which includes an enveloping worm 10 having a single thread 12 and a worm gear 16 having three gear teeth 14. As can be understood, as worm 10 rotates in the direction of Arrow A, thread 12 which is engaged with tooth 14a presses downward on tooth 14a to cause rotation of worm gear 16 in the direction of Arrow "B". As worm gear 16 rotates, gear tooth 14b then comes into engagement with thread 12 and is acted on to cause further rotation of worm gear 16 as gear tooth 14a disengages from thread 12.

Figure 2:
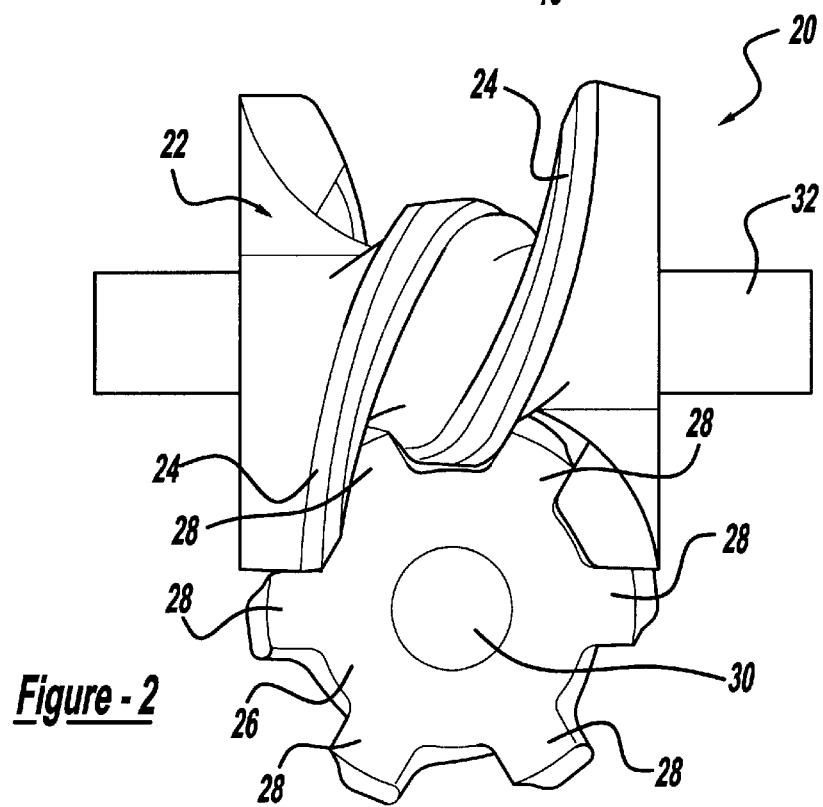
FIGS. 2 and 3 are views of a worm/worm gear transmission with the worm gear having six teeth according to the principles of the present invention.
Figure 3:
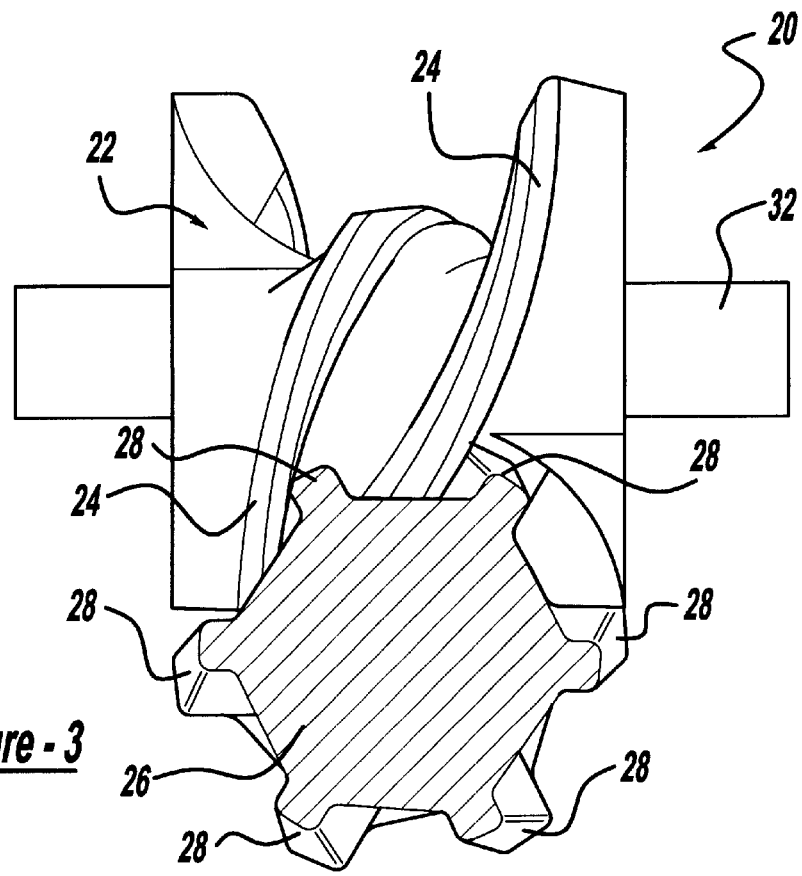
Figure 4:
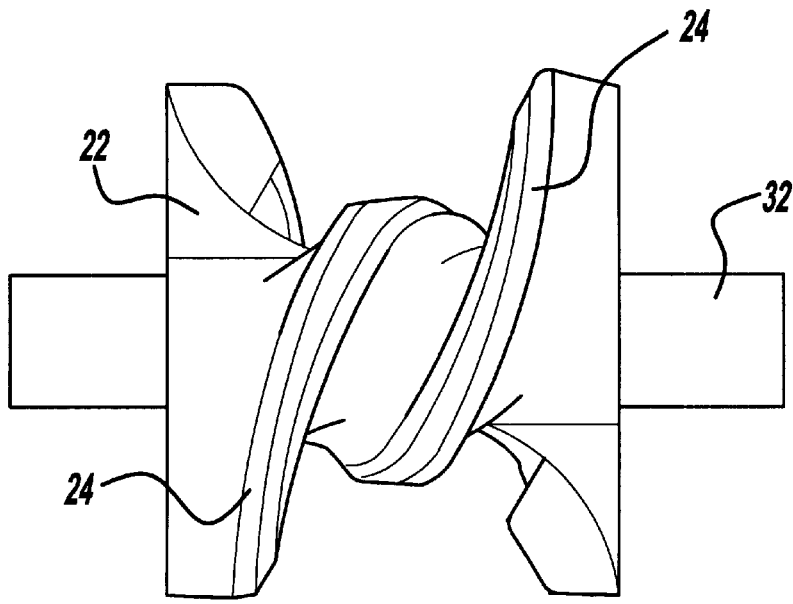
FIG. 4 is a side view of an enveloping worm having two threads.
Figure 18:
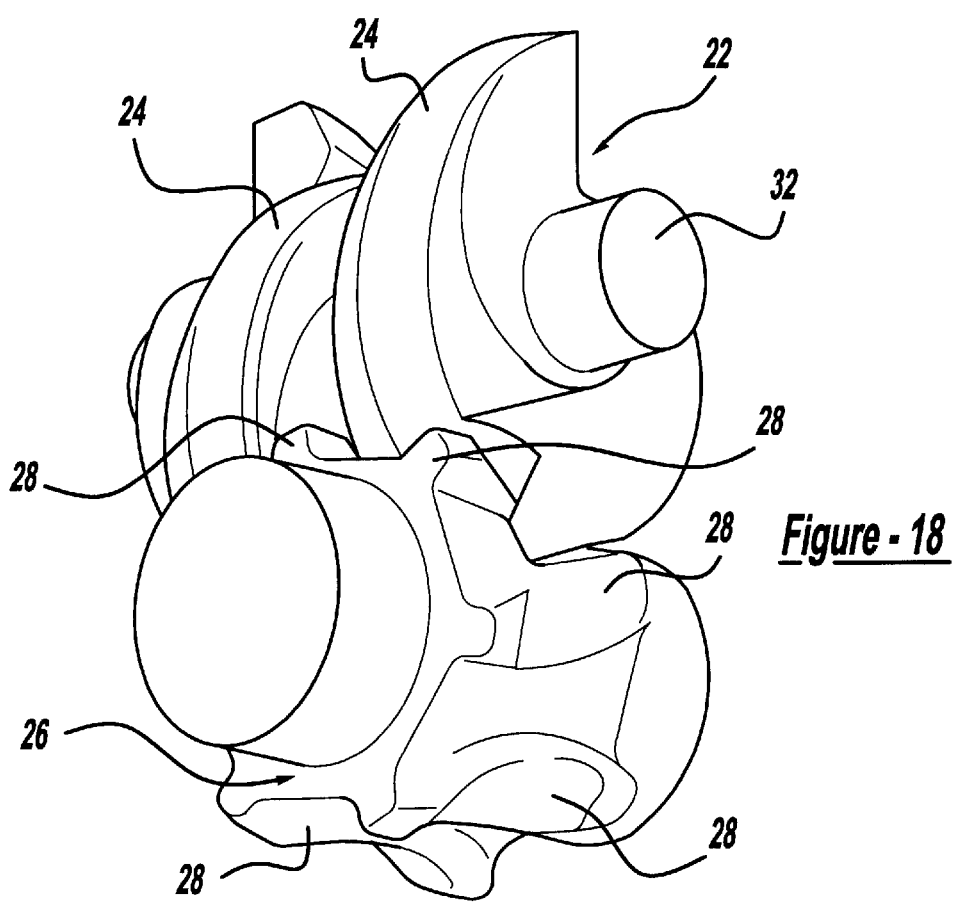
FIG. 18 is a perspective view of the worm/worm gear transmission shown in FIG. 2 with six worm gear teeth and two threads on the worm.

Another embodiment of a worm/worm gear transmission 20 of the present invention is illustrated in FIG. 2. This transmission has an enveloping-type worm 22 with two identical screw threads 24. Threads 24 are engaged by at least one tooth of an enveloping-type worm gear 26 shown to have six teeth 28. Worm gear 26 is connected to a shaft 30 while worm 22 is connected to a shaft 32. In FIG. 3, worm gear 26 is shown in cross-section. FIG. 4 is a side view of enveloping worm 22 with two identical threads 24 and supporting shaft 32. FIG. 18 is a perspective view corresponding with worm/worm gear transmission 20 shown in FIG. 2 and which includes enveloping worm gear 26 having six teeth 28 in mesh with enveloping worm 22 having two threads 24.

Figure 5:
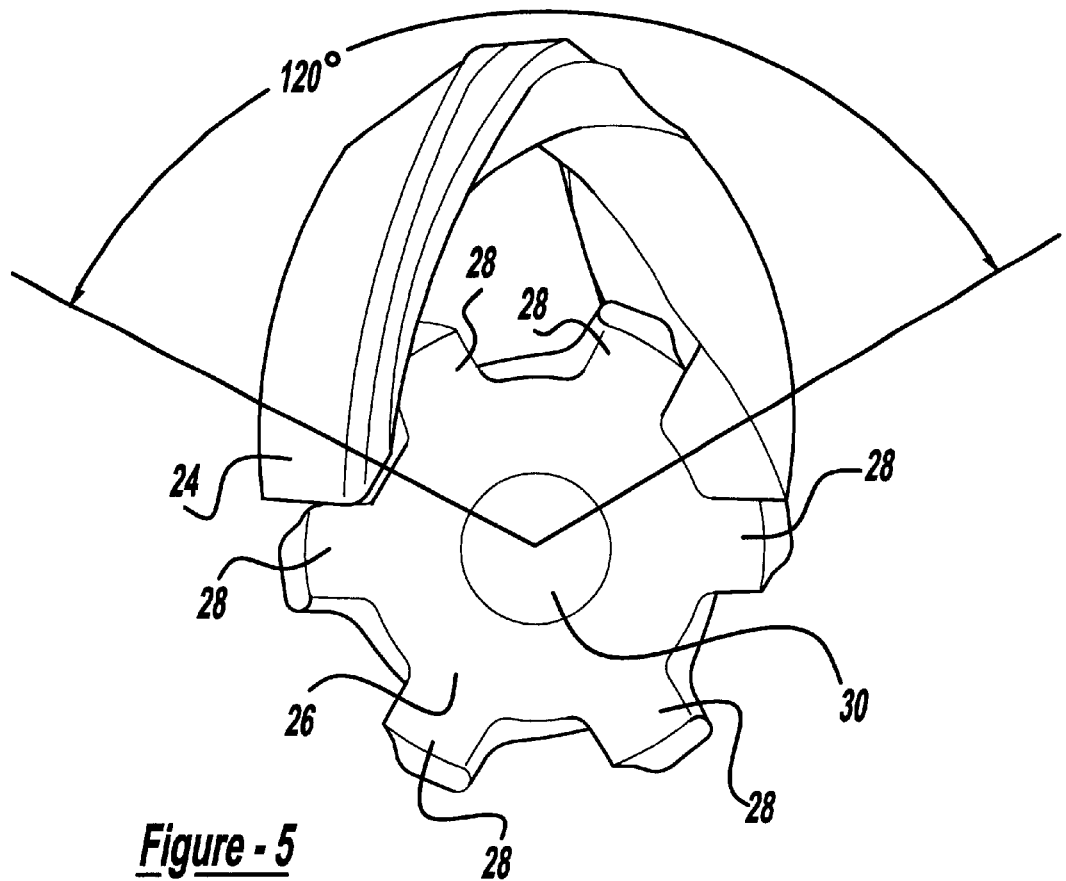
FIG. 5 illustrates an enveloping thread of a worm used for generating the gear teeth profile of the worm gear.

FIG. 5 shows an enveloping angle of 120° for enveloping worm thread 24 that is used to generate the six teeth 28 on worm gear 26. This enveloping worm thread 24 has one revolution of thread or 360° of revolution around its axis of rotation. For illustration of one revolution for the enveloping worm thread, we could use this example: the ends of worm threads have the same cross-sections but could be placed from one position to another position, which is a distinct 120°. This is possible by movement of the cross-section of the worm from one end along the worm thread 24 to another end. In this case, the cross-section will rotate 360° around the axis of rotation for shaft 32.

Figure 21:
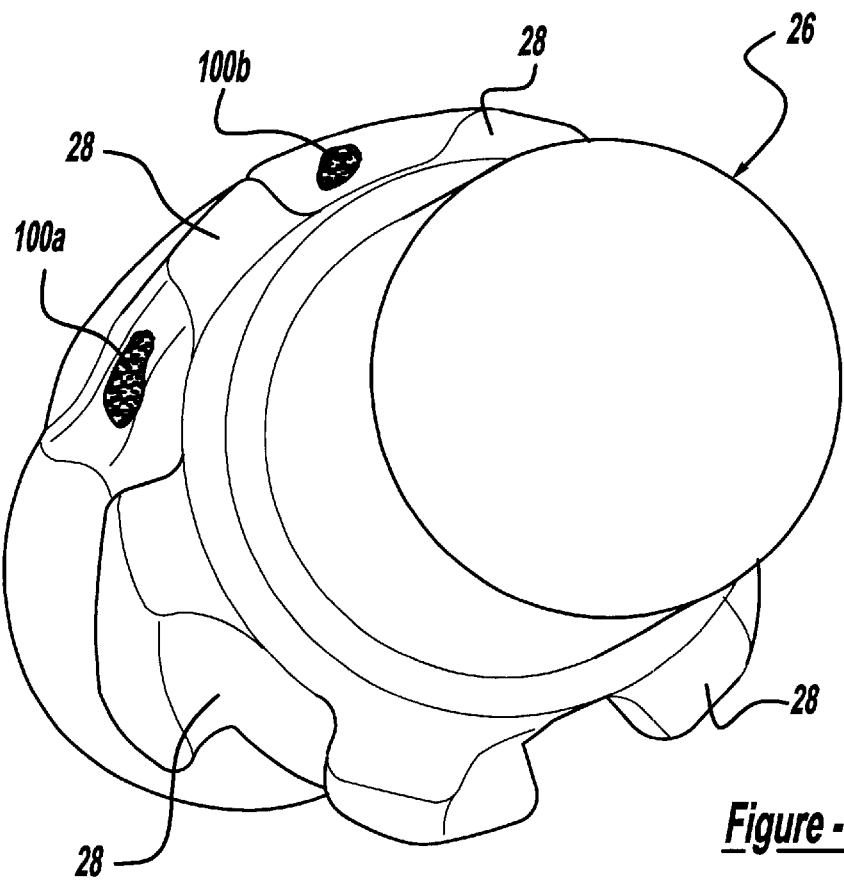
FIG. 21 is a perspective view of a worm gear with six teeth with darkened spots illustrated on the surface of the teeth to indicate the contact surface with the worm in mesh.
Figure 22:
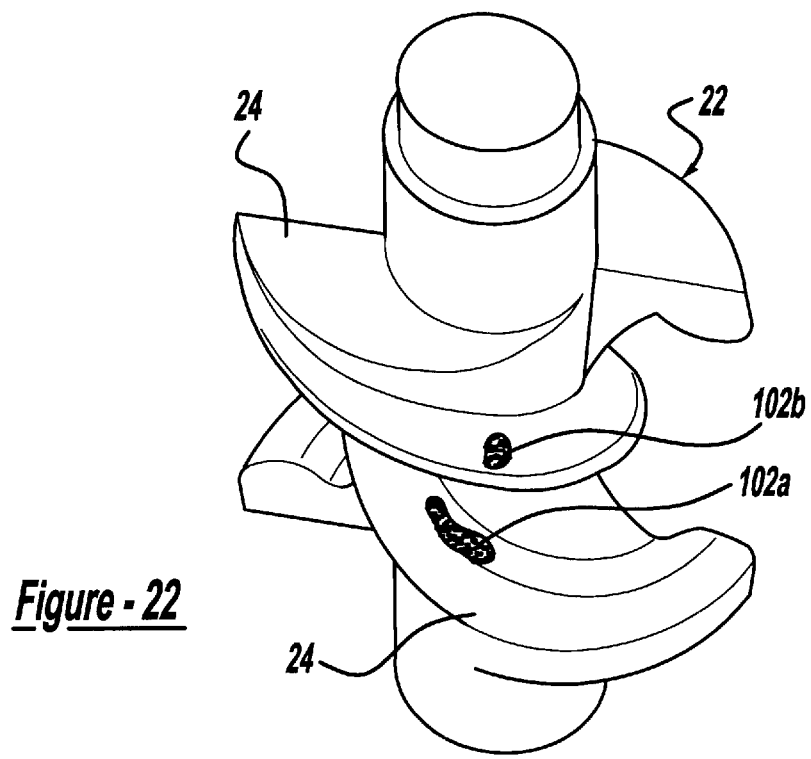
FIG. 22 is a perspective view of a worm with two threads with darkened spots illustrated on the surface of the thread to indicate the contact surface with the worm gear in mesh.
Figure 23:
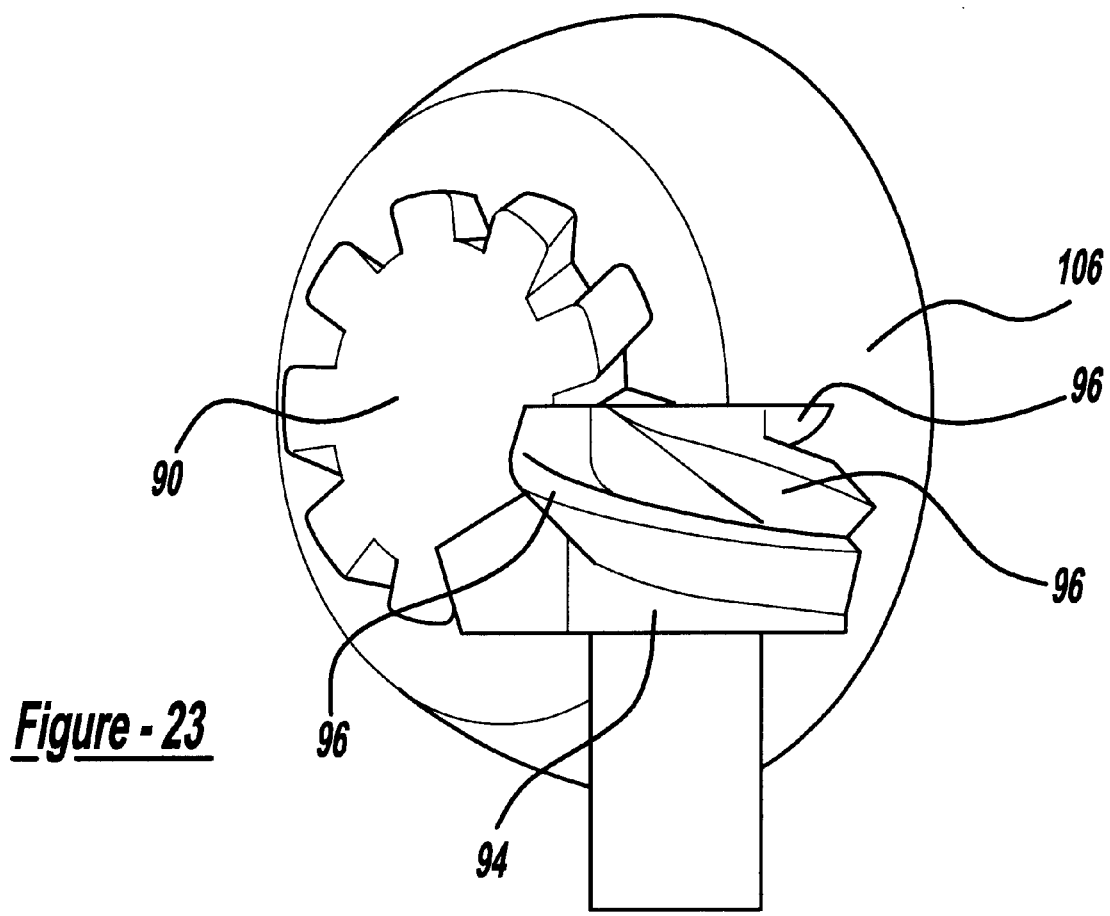
FIG. 23 illustrates the size difference of the worm/worm gear transmission of FIG. 20 in comparison to the size of a typical hypoid gear.

The enveloping worm/worm gear transmissions of the present invention provide for a worm gear having fewer than twenty-four teeth and also provides surface contact between the thread of the worm and the teeth of the worm gear as illustrated in FIGS. 21 and 22. FIG. 21 illustrates two surface contact spots 100a, 100b for a worm gear 26 having six teeth 28. FIG. 22 illustrates two corresponding surface contact spots 102a, 102b for a worm 22 with two threads 24.

Figure 6:
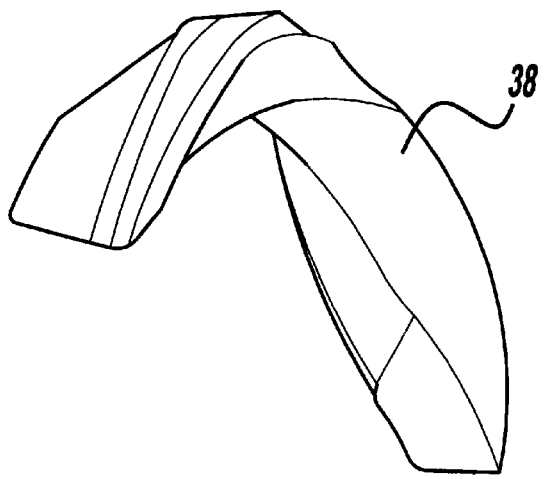
FIG. 6 is a view of a shortened thread of a worm used for generating the gear teeth profile of the worm gear.

FIG. 6 shows a worm thread 38 used for generating worm gear teeth and which is a shortened portion of a thread having an enveloping angle of 120°.

Figure 7:
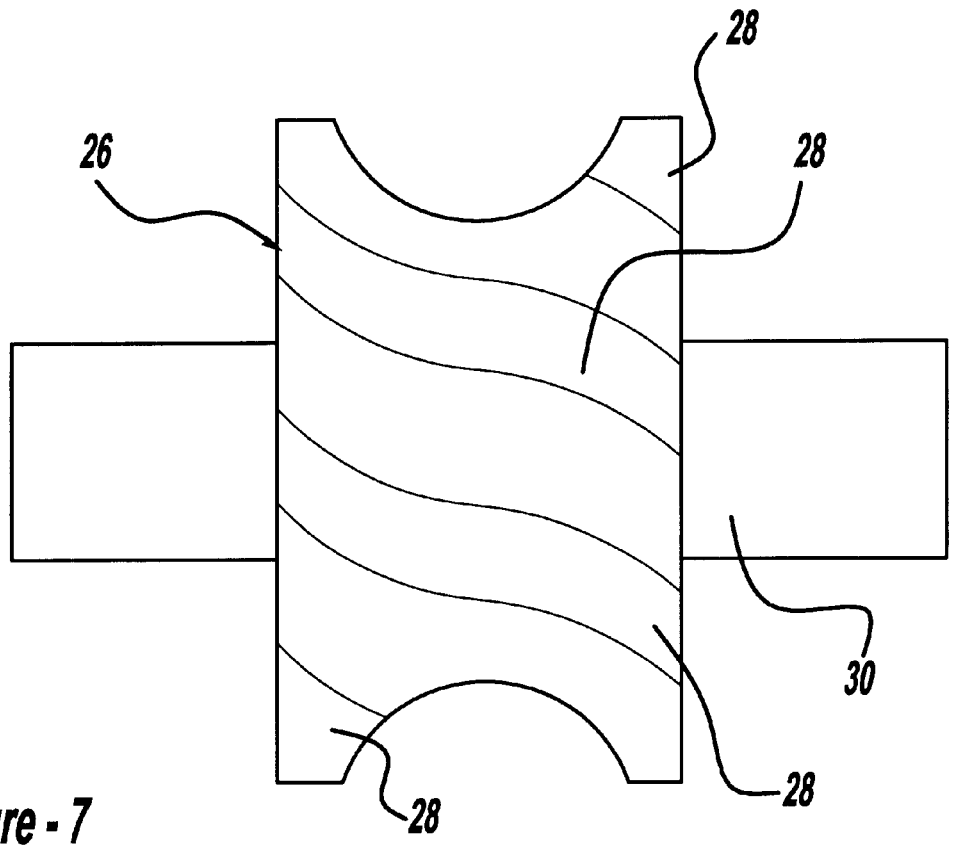
FIG. 7 shows an enveloping worm gear according to the principles of the present invention.
Figure 8:
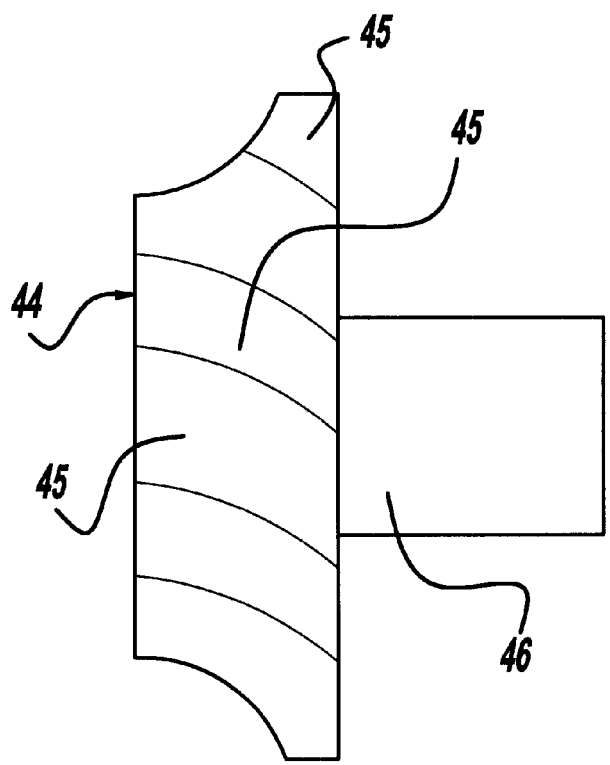
FIG. 8 shows a modified enveloping worm gear.

FIG. 7 shows a side view of enveloping worm gear 26 with six teeth 28. FIG. 8 shows an enveloping worm gear 44 having six teeth 34 which is modified from worm gear 26 shown in FIG. 7 by shortening the gear along its axis of rotation around a shaft 46. Practically, worm gear 44 could be longitudinally split into two halves and using only one shortened part or generated worm gear from blank, which is already shortened. Modified worm gear 44 is easy to assemble in a single reduction unit. This is very important for gears with a small pressure angle when it is difficult to assemble an enveloping worm with an enveloping type of worm gear. For many applications, only the modified worm gear 44 may be adequate. Enveloping worm gear 44 could connect to drive shaft 46 for supporting worm gear 44 from only one side or could be supported on both sides.

The bodies of enveloping worm gears 26 and 44 have axially extending end flanges that hook underneath flanges of adjacent collars to hold the worms in place. One or both of the worm and worm gear bodies are keyed or otherwise fastened to the shaft for driving or being driven. Relatively slight longitudinal movement of one or both the worm or worm gear allows for disassembling the entire worm gear— collars—shaft assembly.

In the present invention, it is preferred that the ratio of the number of teeth 14 on worm gear 16 relative to the number of threads 12 on worm 10 is 11 to 1 and less. Most preferably, the ratio is three or even less, as shown. It is possible that only two teeth 14 need to be utilized on worm gear 16. The worm/worm gear transmission used in the present application could also self-lock. The term "self-locking" as it is utilized in this application to describe the inventive worm and worm gear combinations, means that the teeth of the worm gear, when in contact with the thread of the worm, are not capable of rotating the worm about the axis of the worm. For example, teeth 14 do not slip on thread 12, thereby causing thread 12 to rotate about its own axis. By carefully selecting the material of teeth 14 and threads 12, and the respective angles, a worker of ordinary skill in the art would be able to achieve this goal. The worm/worm gear transmission of the present invention particularly lends itself to a geometric as opposed to a purely frictional type self-locking device.

Figure 9:
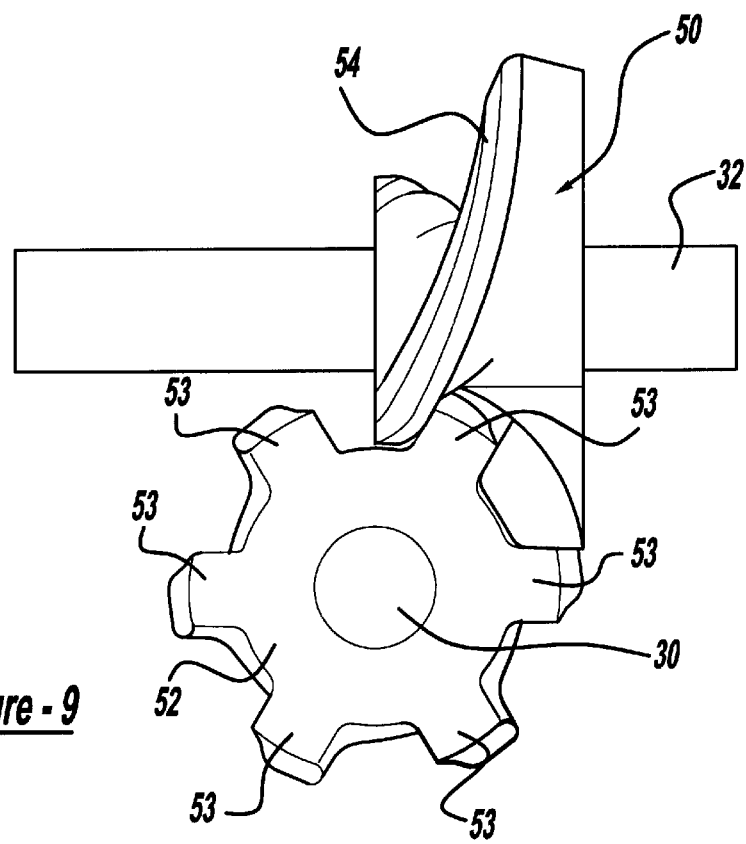
FIGS. 9 and 10 show a worm/worm gear transmission utilizing a modified worm.

FIG. 9 shows a shortened enveloping worm 50 with an enveloping type of worm gear 52, which has a different profile of teeth 53, compared to teeth 28 of worm gear 26 (shown in FIGS. 2 and 7) even for the same number of worm gear teeth. This difference is due to the fact that the profile of teeth 53 was generated by a shortened enveloping thread 54 for shortened enveloping worm 50.

Figure 10:
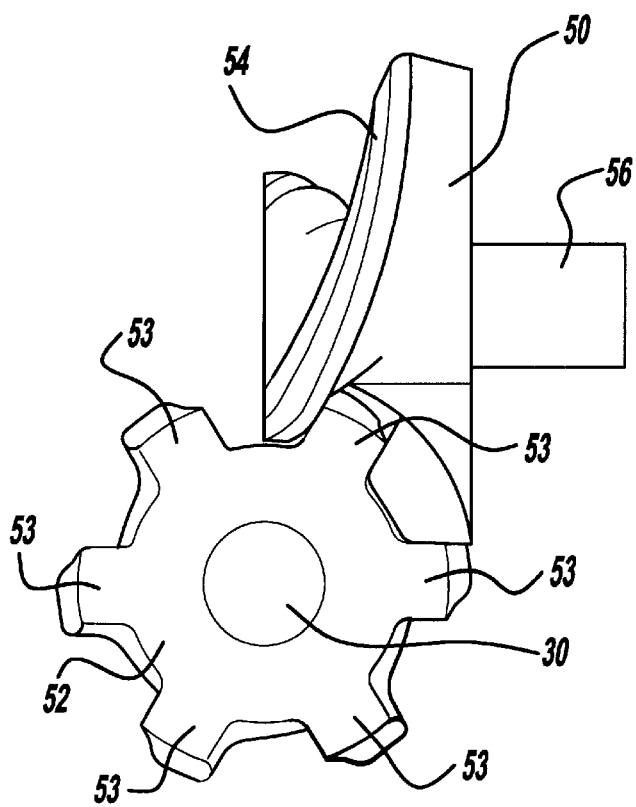
Figure 11:
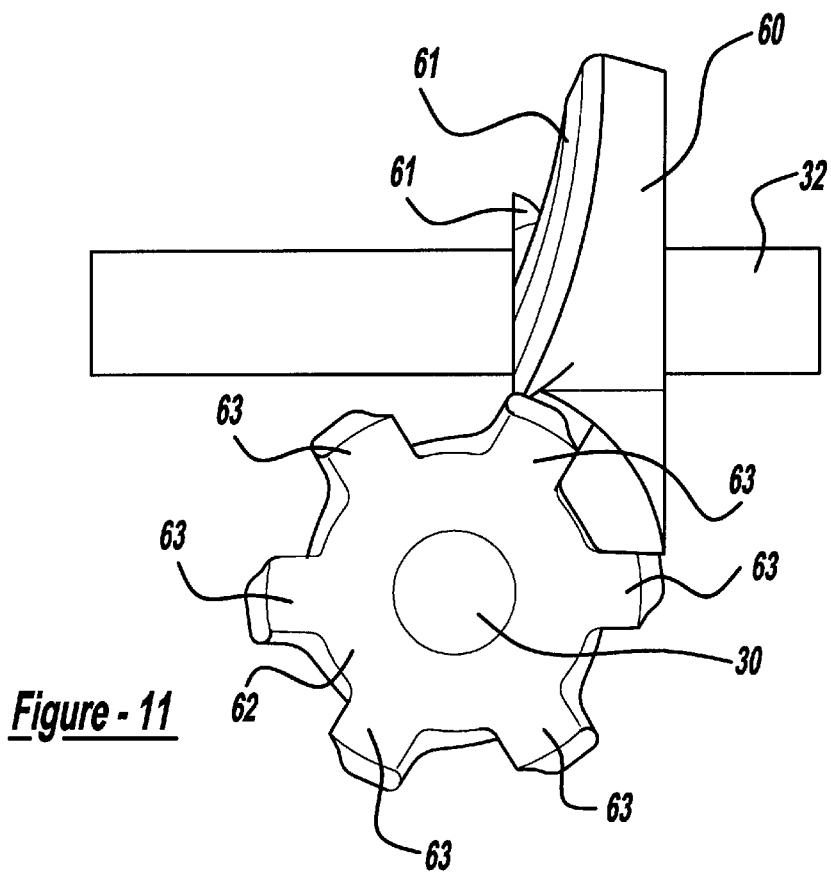
FIG. 11 shows a worm/worm gear transmission with a modified worm in an off-center position.
Figure 12:
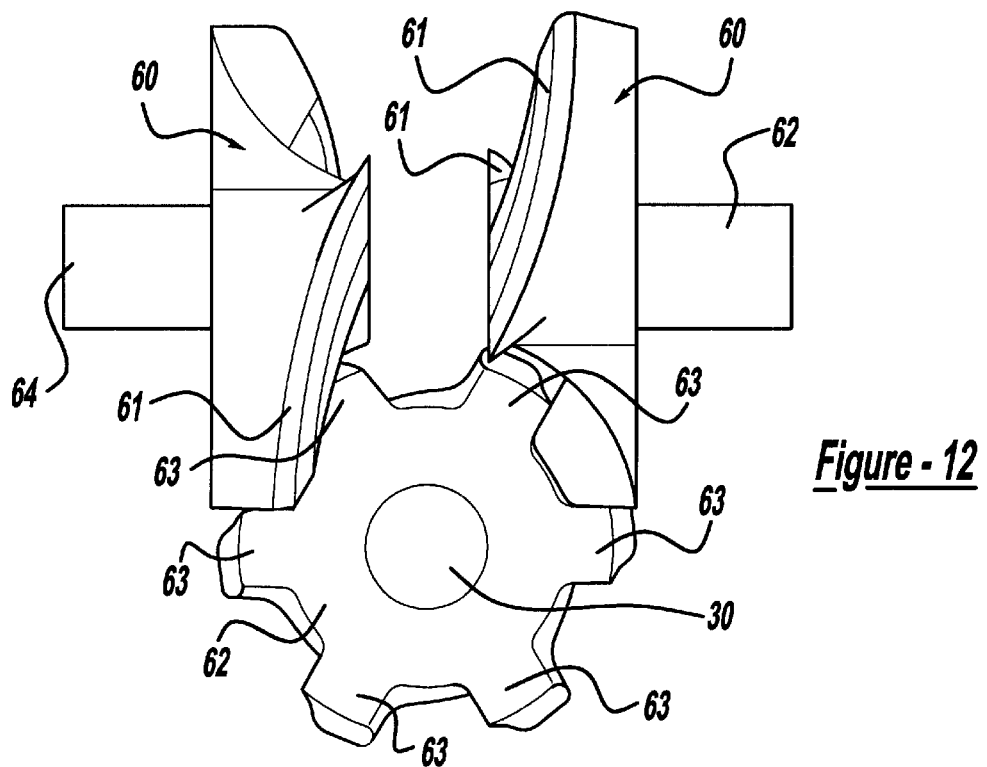
FIG. 12 shows a worm/worm gear transmission with two modified worms in off-center positions.

In FIG. 10, enveloping worm 50 is connected to a drive shaft 56 which supports worm 50 from one side. FIG. 11 shows a view of a worm/worm gear transmission with a modified enveloping split worm 60 having two threads 61 in an off-center position relative to an enveloping-type worm gear 62 having six teeth 63. In contrast, FIG. 12 shows a side view of a worm/worm gear transmission with two modified worms 60 having two threads 61 in off-center positions and respectively connected to different drive shafts 62 and 64 and each meshingly engaged with worm gear 62.

Figure 13:
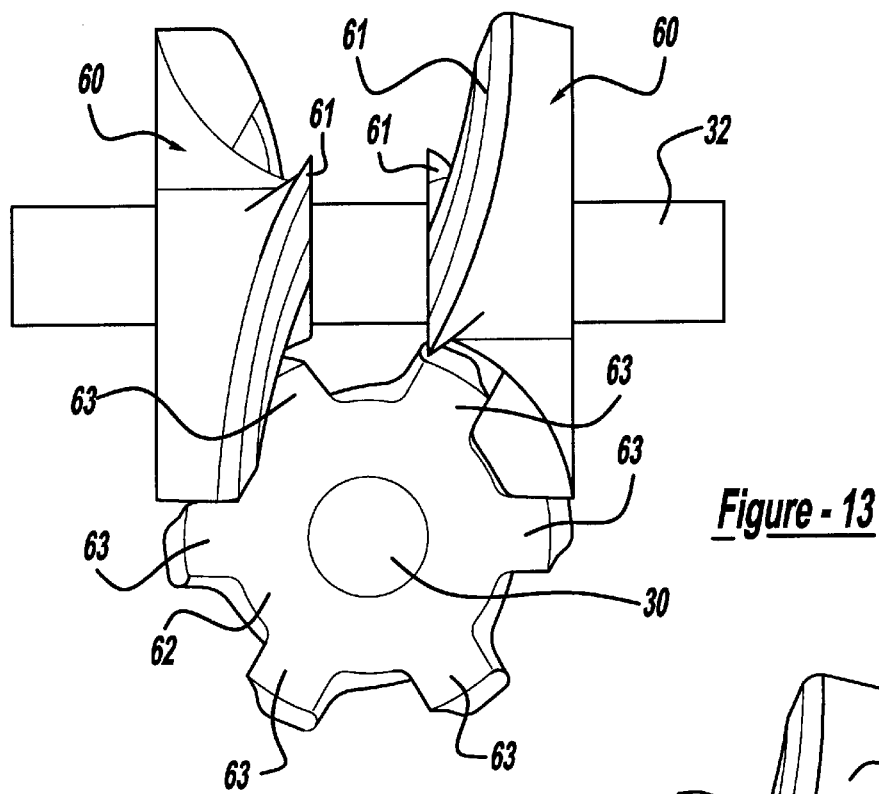
FIG. 13 shows a worm/worm gear transmission with two modified worms aligned on the same axis of rotation and connected to a common shaft.

FIG. 13 shows a view of a worm/worm gear transmission with two modified worms 60 in off-center positions placed on the same axis of rotation and both connected to drive shaft 32. When the modified worms are connected to a common shaft with a different angular phase of the threads, it means that in motion, the threads of one worm are entering mesh with the worm gear teeth while the thread of the other worm are released from mesh at different times. The purpose of the phase difference is to increase the contact ratio and to provide smooth mesh.

Figure 14:
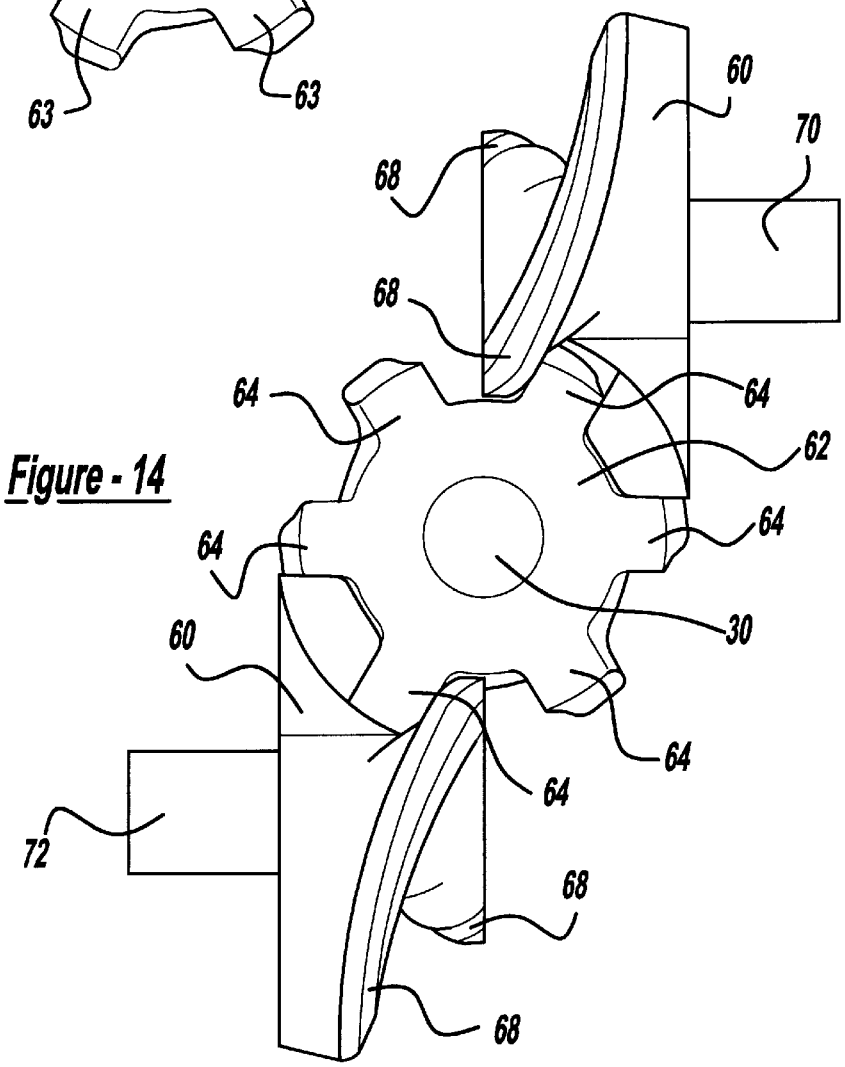
FIG. 14 shows a worm/worm gear transmission with two modified worms located on different axes of rotation.

FIG. 14 shows a view of a worm/worm gear transmission with two modified worms 60 having worm threads 68 each placed on different axes of rotation and connected to different drive shafts 70 and 72. Each of worms 60 meshingly engages the worm gear 62 having teeth 64.

Figure 15:
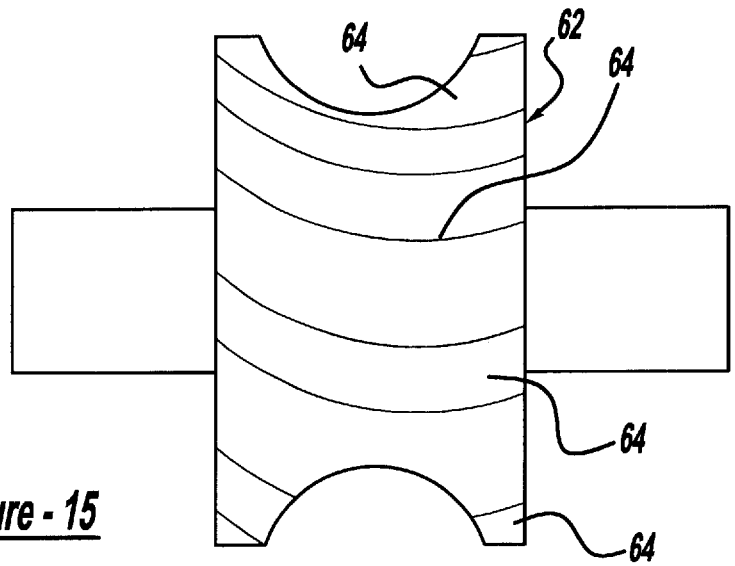
FIG. 15 shows an enveloping worm gear with a different tooth profile.

FIG. 15 shows a side view of an enveloping worm gear 62 with teeth 64 have a different profile which is generated by enveloping thread 68 of worm 60 as shown in FIG. 14.

Figure 16:
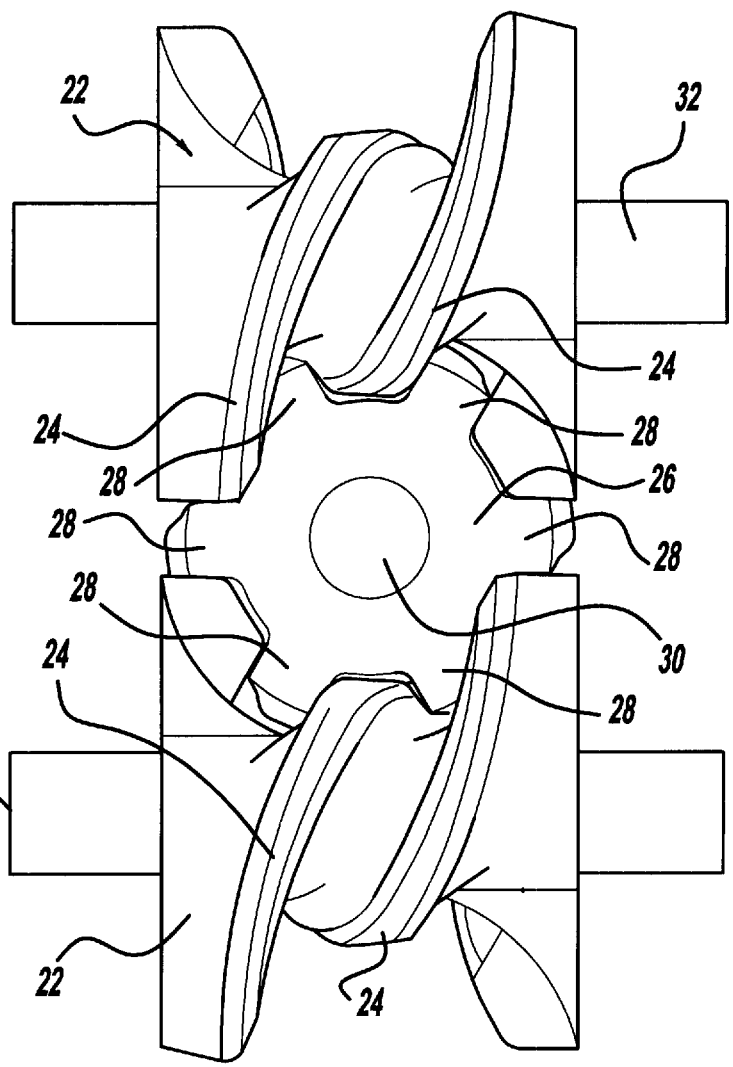
FIG. 16 shows a worm/worm gear transmission with two enveloping worms placed on different axes of rotation.

FIG. 16 shows a view of a worm/worm gear transmission with two enveloping worms 22 having corresponding worm threads 24 placed on different axes of rotation and which are connected to drive shafts 32 and 23. Each of worms 22 meshingly engages enveloping worm gear 26.

Figure 19:
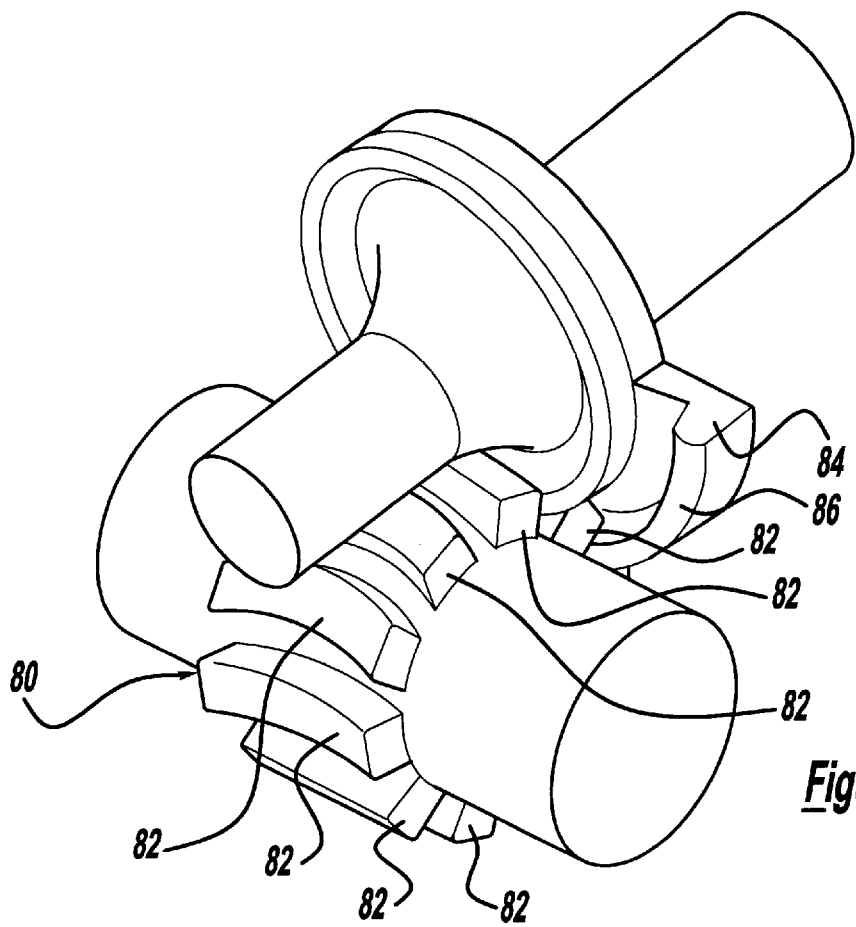
FIG. 19 is a perspective view of a worm/worm gear transmission with ten worm gear teeth and with a single thread worm.

FIG. 19 is a perspective view of a worm/worm gear transmission including worm gear 80 having ten teeth 82 in mesh with an enveloping split worm 84 including a thread 86.

Figure 20:
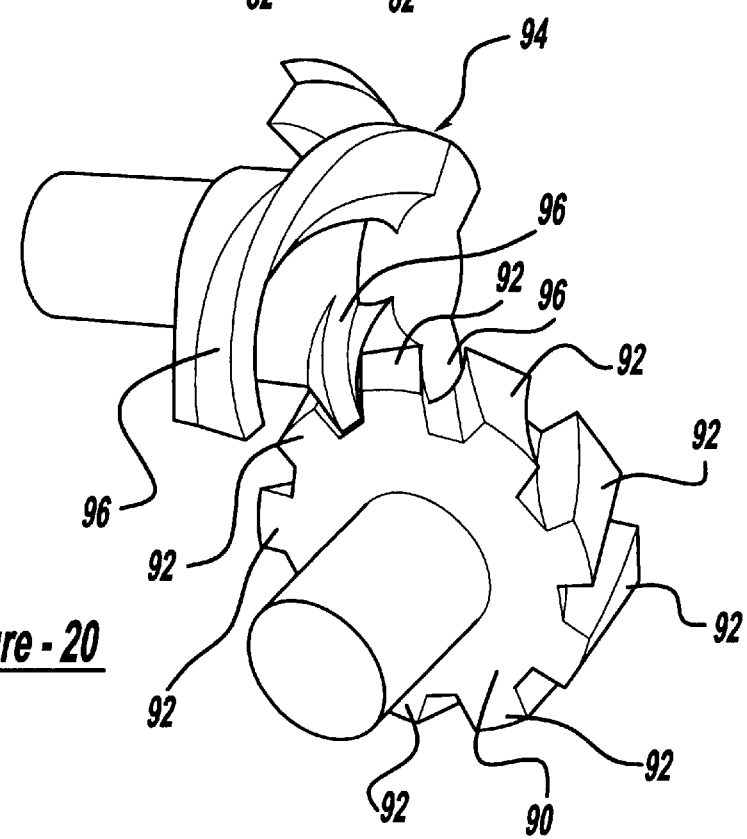
FIG. 20 is a perspective view of a worm/worm gear transmission with nine worm gear teeth and a modified worm having three threads on the worm.

FIG. 20 is a perspective view of a worm gear 90 having nine teeth 92 in mesh with a modified enveloping split worm 94 having three threads 96.

For the inventions described in the present patent application, there could be two different types of operations. When the worm/worm gear transmission does not incorporate the self-lock feature, the motion could be provided from the drive shaft through enveloping worm 12 and enveloping-type worm gear 16 to an output shaft or back from the output shaft to the drive shaft 32. The same operation is applicable for motion from the drive shaft to the driven shafts or from the driven shafts to drive shaft of the various other embodiments shown. Alternatively, when the worm/worm gear transmission does include the self-lock feature, rotary motion can be is provided only from the drive shaft to the enveloping worm and through the enveloping type worm gear to the output shaft. Thus, the worm/worm gear transmissions shown in FIGS. 12, 14 and 16, with independent drive shafts connected to the worms, could be used in a split-power transmission to transmit energy from a high-speed engine to a rotor drive shaft.

In the present invention, a self-locking worm/worm gear combination can have a worm gear to worm thread ratio that is preferably ten and less. Such a system is desirable so that each one of the worm and worm gear combinations described above can transmit very high torque loads when compared to prior systems. The lower noise of the worm/worm gear transmission, compared with hypoid and bevel gear transmission, make using the worm/worm gear transmission of the present invention more beneficial, particularly in motor vehicle powertrain applications. For the same size, this invention can provide more than twice the capacity of hypoid gearing, where the hypoid gear also has more than 24 teeth. The smaller number of teeth of the present invention than in a hypoid gear of the same circumference makes each tooth thicker and therefore stronger. In the illustration shown in FIG. 23, a modified worm 94 with three threads 96 is shown which has a shape and size similar to a pinion of a hypoid transmission. Assuming the modified worm 94 is the same size as the pinion of a hypoid gear set, the diameter of hypoid gear 106 is twice the diameter of worm gear 90. Up to now, those skilled in the art were of the opinion that an enveloping type worm gear with less than twenty-four teeth would not work and/or that it presented an insurmountable barrier to commercial applications.

Figure 24:
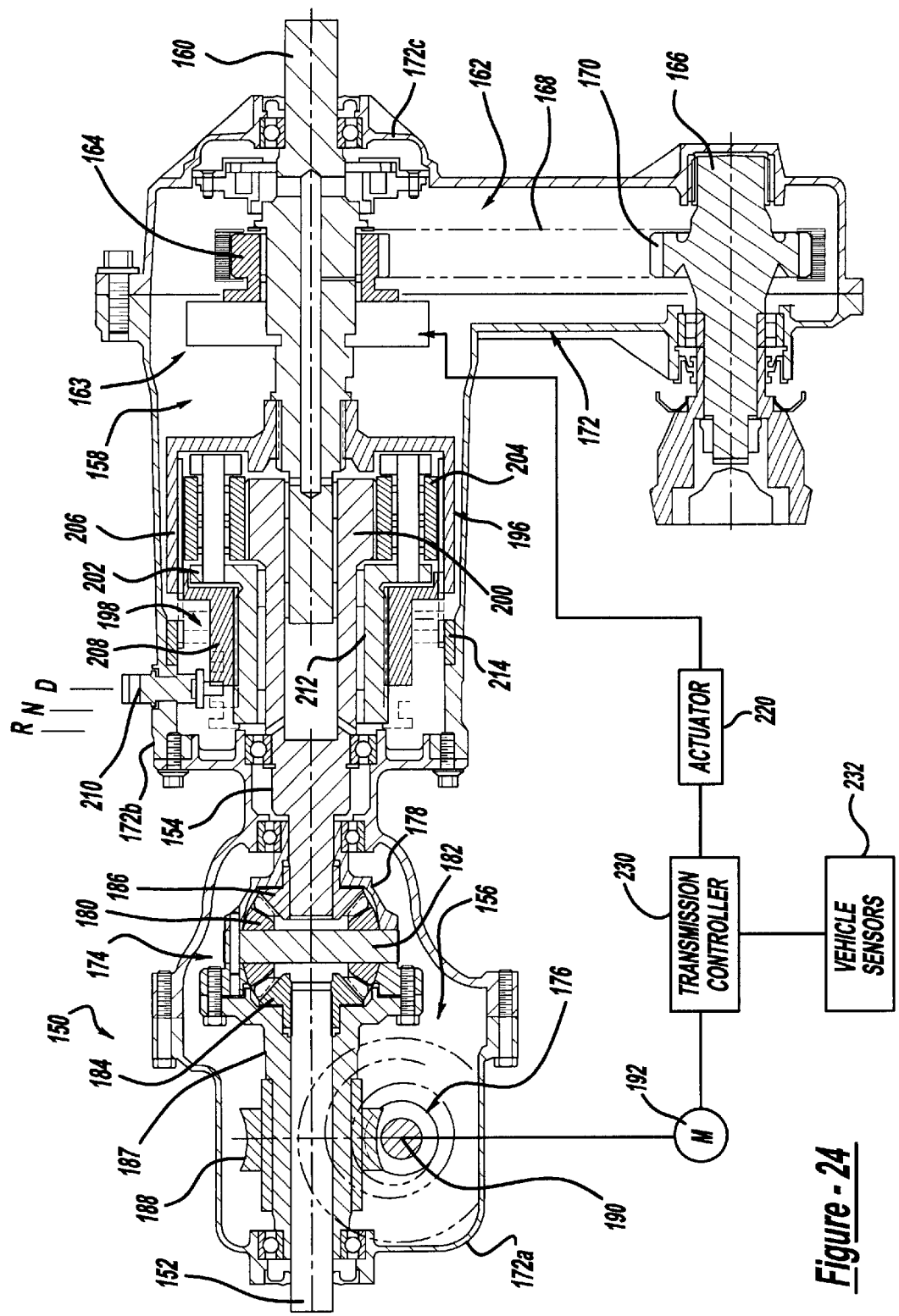
FIG. 24 is a sectional view of the continuously variable four-wheel drive transmission according to the principles of the present invention.

Referring now to FIG. 24, a four-wheel drive transmission 150 is shown which includes an input shaft 152, and intermediate shaft 154, a continuously variable transmission (CVT) unit 156 operably coupling input shaft 152 to intermediate shaft 154, a rear output shaft 160, a drive selector unit 158 operably coupling intermediate shaft 154 to rear output shaft 160, a front output shaft 166, and a torque transfer unit 162 operably disposed between rear output shaft 160 and front output shaft 166. Torque transfer unit 162 includes a coupling 163, a first sprocket 164 rotatably supported on rear output shaft 154 and adapted to receive drive torque therefrom via actuation of coupling 163, a second sprocket 170 fixed to front output shaft 166, and a chain 168 connecting sprockets 164 and 170. Four-wheel drive transmission 150 also includes a housing assembly 172 which supports all the afore-mentioned components and maintains a sealed sump of lubricant. Housing assembly 172 includes a first section 172a for enclosing CVT unit 156, a second section 172b for enclosing drive selector unit 158, and a third section 172c for enclosing torque transfer unit 162. These sections can be bolted together to define a common assembly or, in the alternative, housing assembly 172 could be configured as a unitary housing.

CVT unit 156 includes a differential 174 and a drive mechanism 176. Differential 174 is shown to be a bevel gearset including a carrier assembly 178 with pinion gears 180 rotatably supported from pinion shaft 182. Pinion gears 180 both mesh with an input side gear 184 and an output side gear 186. Input side gear 184 is fixed to input shaft 152 and output side gear 186 is fixed to intermediate shaft 154. Drive mechanism 176 is comprised of a worm/worm gear transmission and a power-operated drive unit. Specifically, a tubular extension 187 of carrier assembly 178 is rotatably supported on input shaft 152 and has an enveloping worm gear 188 fixed thereto. The thread(s) of an enveloping worm 190 are in meshing engagement with the teeth of enveloping worm gear 188. Worm 190 is selectively driven by an electric motor 192. Enveloping worm 190 and worm gear 188 define a worm/worm gear transmission preferably of the type described above wherein the gear ratio is low. Specifically, it is desirable that enveloping worm gear 186 have fewer than twenty-four teeth.

As can be understood by one having ordinary skill in the art, the rotational speed of intermediate shaft 154 which provides input to drive selector unit 158 can be varied relative to the rotational speed of input shaft 152 by controlling the rotational speed of carrier assembly 178 of differential 174. When electric motor 192 is not operated, worm 190 and worm gear 188 provide a self-lock function which prevents carrier assembly 178 from rotating. Thus, when carrier assembly 178 is prevented from rotating, the rotation of input shaft 152 is directly transmitted via input side gear 184 through pinion gears 180 output side gear 186 for directly driving intermediate shaft 154 at a one-to-one drive ratio. However, if electric motor 192 is operated to rotate worm 190 at a variable speed relative to worm gear 188, carrier assembly 178 provides a differential speed to differential 174 which allows for a continuously variable transmission of speed to intermediate shaft 154 based upon the speed at which electric motor 192 drives worm 190. As such, variable control of the rotary speed of worm 190 via motor 192 provides a continuously variable transmission of power to intermediate shaft 154.

Drive selector unit 158 is operable to control the rotary direction and ratio between intermediate shaft 154 and rear output shaft 160. Drive selector unit 158 includes a planetary gearset 196 and a mode shaft mechanism 198. Planetary gearset 196 includes a sun gear 200 fixed to intermediate shaft 154. A planetary carrier 202 is mounted for concentric rotation about sun gear 200. A plurality of pinion gears 204 are rotatably supported on planetary carrier 202 in meshing engagement with sun gear 200 and a drive annulus 206. Drive annulus 206 is provided with a splined connection to rear output shaft 160. Mode shift mechanism 198 includes a lock collar 208 and a gearshift lever 210 which permits a vehicle operator to move lock collar 208 between a DRIVE (D) position, a NEUTRAL (N) position and a REVERSE (R) position. Lock collar 208 is splined for rotation with and axial movement on an axial extension 212 of carrier 202.

When lock collar 208 is in its DRIVE position (as shown in FIG. 24), its external clutch teeth are engaged with internal clutch teeth on drive annulus 206. As such, carrier 202 and drive annulus 206 are locked together to prevent relative rotation therebetween such that planetary gearset 196 is disabled. Thus, the rotation of intermediate shaft 154 is transmitted directly through sun gear 200 to drive carrier 202 and drive annulus 206 at a common speed and in a common direction, thereby causing rear output shaft 186 to be driven at the same common speed and direction for establishing a forward motive condition.

When lock collar 208 is in the NEUTRAL position, lock collar 208 is totally disengaged with respect to drive annulus 206 and a ground ring 214 that is non-rotatably secured to housing 172b. Thus, rotation of intermediate shaft 172 causes sun gear 200 to rotate, thereby driving pinion gears 204. If there is resistance applied to the rear output shaft 160 and thus, drive annulus 206, carrier 202 then rotates relative to sun gear 200 so that pinion gears 204 can planetate around sun gear 200 without transferring drive torque to rear output shaft 160.

When lock collar 208 is moved to its REVERSE position, the external clutch teeth on lock collar 208 become engaged with internal clutch teeth on ground ring 214 in order to prevent rotation of carrier 202 relative to housing 172b. Thus, rotation of intermediate shaft 154 causes rotation of sun gear 200 which drives pinion gears 204. Because planetary carrier 202 is prevented from rotating, the rotation of pinion gears 204 acts to rotate drive annulus 206 in a direction opposite to the rotation of sun gear 200 in order to obtain a reverse rotation of rear output shaft 160.

Coupling 163 can be of any known type in order to provide two-wheel drive to four-wheel drive control. Known torque transfer couplings 163 include a viscous coupling or a pump-type speed sensitive coupling which are well known from commonly assigned U.S. Pat. Nos. 5,597,369 and 5,704,863 which are herein incorporated by reference. In addition, known active torque transfer couplings include an electromagnetic clutch coupling which is automatically controlled based upon sensor based inputs which detect a rotational different in the front and rear wheel drives as is well known from commonly assigned U.S. Pat. Nos. 5,215,160 and 5,275,253 which are herein incorporated by reference. In addition, adaptively activated clutch pack clutches can also be utilized as active torque transfer couplings as is well known from commonly assigned U.S. Pat. No. 5,704,867 which is herein incorporated by reference.

Torque transfer coupling 163 supplies torque from rear output shaft 160 to drive sprocket 164 which, in turn, delivers torque to driven sprocket 170 via chain 168. It should be understood that other known torque delivery systems such as a pulley and belt or a geartrain can be utilized for providing torque between rear output shaft 160 and front output shaft 166. For purposes of example, coupling 163 is a mutli-plate clutch having an actuator 220 that can be variably actuated to modulate the clutch engagement force across the clutch, thereby modulating the torque transferred to front output shaft 166.

Transmission 150 further includes a transmission controller 230 which is operable to control actuation of motor 192 and actuator 220. Input signals are delivered to controller from various sensors, identified by block 232, and which are used by controller 230 to adaptively control torque transfer between input shaft 152 and output shafts 160 and 166. Contemplated input signals include, among others, is the rotary speed of all the shafts, brake actuation status, throttle position and steering angle.

Figure 25:
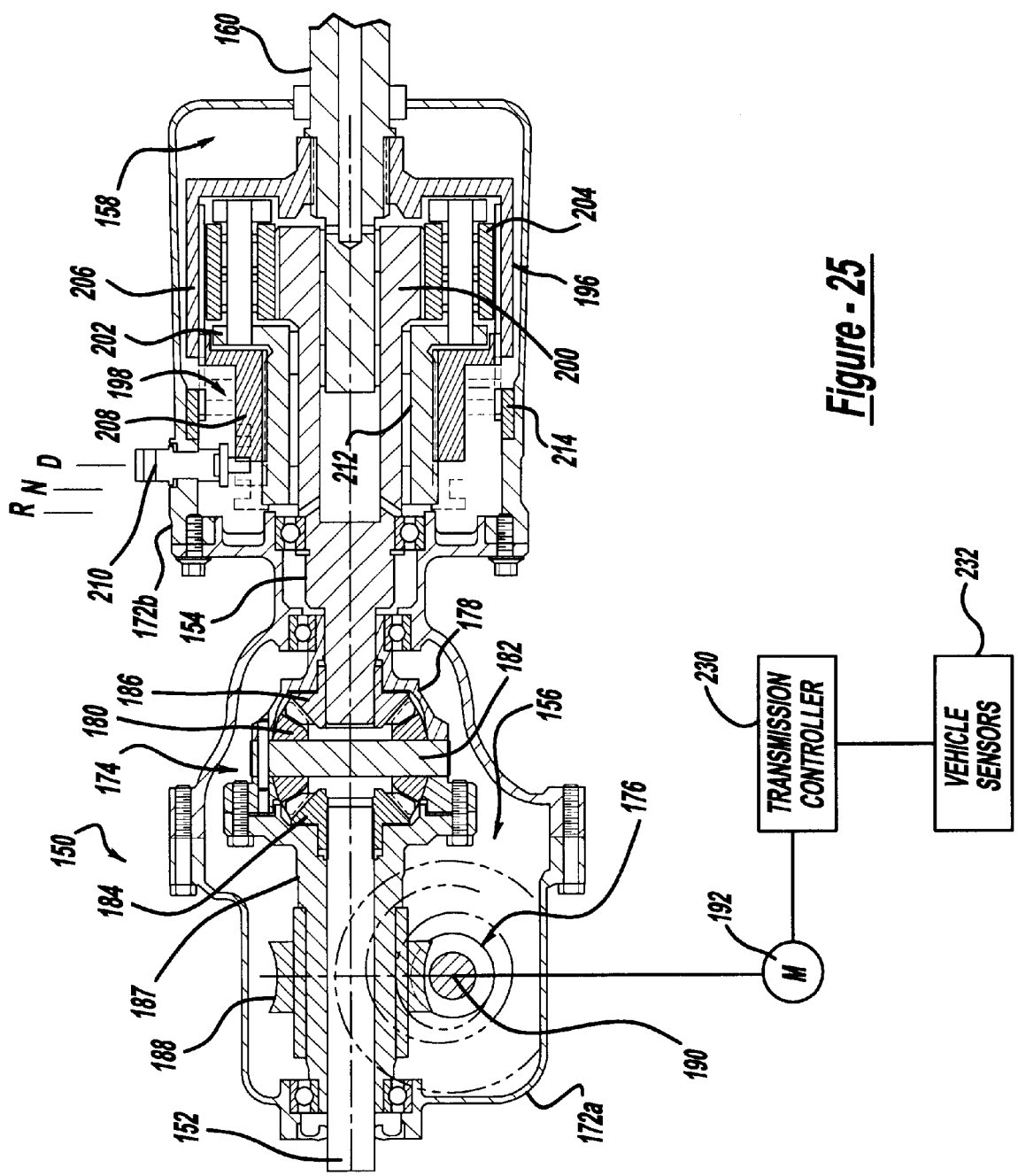
FIG. 25 is a schematic view of a rear-wheel drive transmission according to the present invention.
Figure 26:
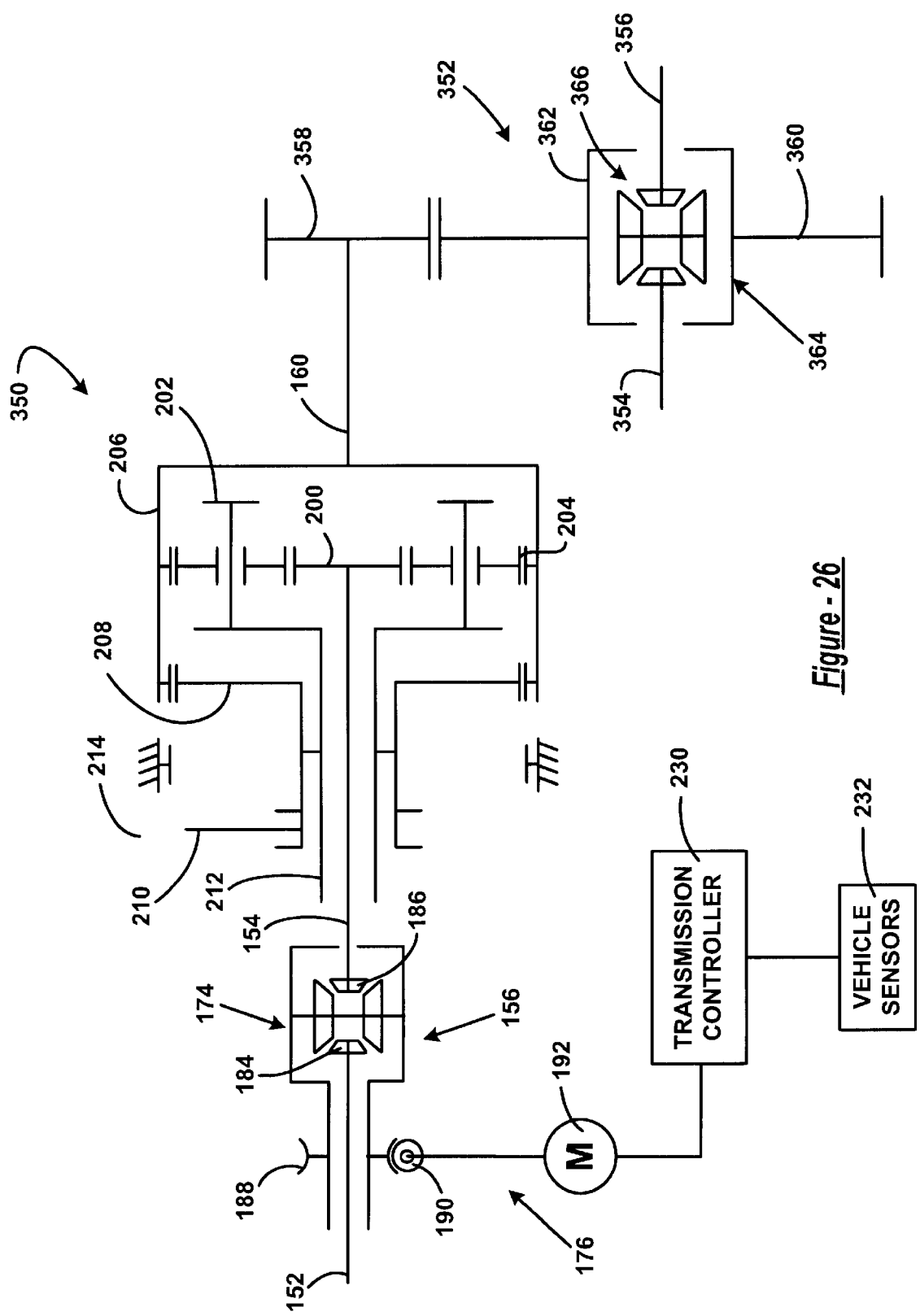
FIG. 26 is a schematic view of a front-wheel drive transmission according to the present invention.

Referring now to FIG. 25, a rear-wheel drive version of a continuously variable transmission 250 is shown. Transmission 250 is similar to transmission 150 with the exception that torque transfer unit 162 has been eliminated such that all drive torque is transferred to rear output shaft. FIG. 26 shows a front-wheel drive version of a continuously variable transmission 350 which is similar to transmission 250 with the exception that a final drive unit 352 is driven by output shaft 160 to transfer drive torque to a pair of axle-shafts 354 and 356. Final drive unit 352 includes an output gear 358 fixed to output shaft 160, a drive gear 360 meshed with output gear 358 and secured to a carrier 362 of a differential 364. Differential 364 has a geartrain 366 interconnecting carrier 362 to axle-shafts 354 and 356.

Various embodiments of the present invention have been disclosed. A worker of ordinary skill in the art would recognize that certain modifications would come within the scope of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for use in a four-wheel drive vehicle having an engine and front and rear drivelines, comprising:

an input shaft adapted to be driven by the engine;

an intermediate shaft;

a continuously variable transmission unit operably coupling said input shaft to said intermediate shaft and including a differential and a drive mechanism, said differential having a first component driven by said input shaft, a second component driving said intermediate shaft, and a third component, said drive mechanism includes a worm gear fixed to said third component, a worm meshed with said worm gear, and a motor for driving said worm;

a rear output shaft adapted to be coupled to the rear driveline;

a drive selector unit for establishing forward and reverse drive connections between said intermediate shaft and said rear output shaft;

a front output shaft adapted to be coupled to the front driveline; and a torque transfer unit for transferring drive torque from said rear output shaft to said front output shaft for establishing a four-wheel drive mode.

2. The transmission of claim 1, further comprising:

sensors for detecting operating characteristics of the vehicle and generating sensor input signals; and a controller for automatically controlling variable actuation of said motor in response to said sensor input signals.

3. The transmission of claim 1 wherein said differential includes a first side gear fixed to said input shaft, a second side gear fixed to said intermediate shaft, pinion gears meshed with said first and second side gears, and a carrier supporting said side gears and pinion gears, wherein said worm gear is fixed for rotation with said carrier such that actuation of said motor causes said worm to rotate said worm gear for varying the rotary speed of said carrier relative to said input shaft which acts to vary the rotary speed of said intermediate shaft relative to said input shaft.

4. The transmission of claim 1 wherein said torque transfer unit includes a first sprocket rotatably supported on said rear output shaft, a second sprocket fixed to said front output shaft, a chain connecting said first and second sprockets, and a coupling for transferring drive torque from said rear output shaft to said first sprocket.

5. The transmission of claim 1 wherein said worm and worm gear are self-locking to prevent rotation of said third component of said differential when said motor is not actuated.

6. The transmission of claim 1 wherein said worm gear is an enveloping worm gear having less than twenty four teeth.

7. A transmission for use in a four-wheel drive vehicle having an engine and front and rear drivelines, comprising:
   an input shaft adapted to be driven by the engine;
   an intermediate shaft;
   a continuously variable transmission unit operably coupling said input shaft to said intermediate shaft and including a differential and a drive mechanism, said differential having a first component driven by said input shaft, a second component driving said intermediate shaft, and a third component, said drive mechanism includes a worm gear fixed to said third component, a worm meshed with said worm gear, and a motor for driving said worm;
   a rear output shaft adapted to be coupled to the rear driveline;
   a drive selector unit for establishing forward and reverse drive connections between said intermediate shaft and said rear output shaft;
   a front output shaft adapted to be coupled to the front driveline; and
   a torque transfer unit for transferring drive torque from said rear output shaft to said front output shaft for establishing a four-wheel drive mode; and
   wherein said drive selector unit includes a planetary gearset operably connecting said intermediate shaft to said rear output shaft, and a mode select mechanism for selectively coupling a first component of said planetary gearset to a second component of said planetary gearset to establish said forward drive connection, said mode select mechanism is further operable for selectively coupling said first component of said planetary gearset to a non-rotary member to establish said reverse drive connection.

8. The transmission of claim 2 wherein said first component of said planetary gearset is a carrier supporting pinion gears, and said second component is a drive annulus gear meshed with said pinion gears and fixed to said rear output shaft, said planetary gearset further including a sun gear fixed to said intermediate shaft and driving said pinion gears, and wherein said mode select mechanism includes a lock collar fixed for rotation with and sliding movement on said carrier between a first position and a second position, said lock collar is operable in its first position to couple said carrier for common rotation with said drive annulus and is operable in its second position to brake rotation of said carrier by coupling said carrier to said non-rotary member.

9. A transmission for use in a vehicle having an engine and a driveline, comprising:
   an input shaft driven by the engine;
   an intermediate shaft;
   a continuously variable transmission unit operably coupling said input shaft to said intermediate shaft and including a differential and a drive mechanism, said differential having a first component driven by said input shaft, a second component driving said intermediate shaft, and a third component, said drive mechanism includes a worm gear fixed to said third component, a worm meshed with said worm gear, and a motor for driving said worm;
   an output shaft adapted to be coupled to the driveline;
   a drive selector unit for establishing forward and reverse drive connections between said intermediate shaft and said output shaft; and
   a control system for controlling actuation of said motor to vary the rotary speed differential between said input shaft and said intermediate shaft, said control system including sensors for detecting operational characteristics of the vehicle and a controller for receiving input signals from said sensors and controlling actuation of said motor in response thereto.

10. The transmission of claim 9 wherein said differential includes a first side gear fixed to said input shaft, a second side gear fixed to said intermediate shaft, pinion gears meshed with said first and second side gears, and a carrier supporting said side gears and pinion gears, wherein said worm gear is fixed for rotation with said carrier such that actuation of said motor causes said worm to rotate said worm gear for varying the rotary speed of said carrier relative to said input shaft which acts to vary the rotary speed of said intermediate shaft relative to said input shaft.

11. The transmission of claim 9 wherein said worm and worm gear are self-locking to prevent rotation of said third component of said differential when said motor is not actuated.

12. The transmission of claim 9 wherein said worm gear is an enveloping worm gear having less than twenty four teeth.

13. The transmission of claim 9 wherein the driveline is a rear driveline such that said output shaft is connected to the rear driveline.

14. The transmission of claim 9 wherein the driveline is a front driveline having a pair of front axleshafts, and wherein said output shaft drives a final drive unit for transferring drive torque to the axleshafts.

15. A transmission for use in a vehicle having an engine and a driveline, comprising:
   an input shaft driven by the engine;
   an intermediate shaft;
   a continuously variable transmission unit operably coupling said input shaft to said intermediate shaft and including a differential and a drive mechanism, said differential having a first component driven by said input shaft, a second component driving said intermediate shaft, and a third component, said drive mechanism includes a worm gear fixed to said third component, a worm meshed with said worm gear, and a motor for driving said worm;
   an output shaft adapted to be coupled to the driveline;
   a drive selector unit for establishing forward and reverse drive connections between said intermediate shaft and said output shaft;
   a control system for controlling actuation of said motor to vary the rotary speed differential between said input shaft and said intermediate shaft, said control system including sensors for detecting operational characteristics of the vehicle and a controller for receiving input signals from said sensors and controlling actuation of said motor in response thereto; and
   wherein said drive selector unit includes a planetary gearset operably connecting said intermediate shaft to said output shaft, and a mode select mechanism for selectively coupling a first component of said planetary gearset to a second component of said planetary gearset to establish said forward drive connection, said mode select mechanism further operable for selectively coupling said first component of said planetary gearset to a non-rotary member to establish said reverse drive connection.

16. The transmission of claim 15 wherein said first component of said planetary gearset is a carrier supporting pinion gears, and said second component is a drive annulus gear meshed with said pinion gears and fixed to said output shaft, said planetary gearset further including a sun gear fixed to said intermediate shaft and driving said pinion gears, and wherein said mode select mechanism includes a lock collar fixed for rotation with and sliding movement on said carrier between a first position and a second position, said lock collar is operable in its first position to couple said carrier for common rotation with said drive annulus and is operable in its second position to brake rotation of said carrier by coupling said carrier to said non-rotary member.

17. A transmission for use in a motor vehicle, comprising:

an input shaft;

an intermediate shaft;

a differential having a first side gear fixed to said input shaft, a second side gear fixed to said intermediate shaft, pinions gears meshed with said first and second side gears, and a carrier supporting said pinions gears and said first and second side gears;

a worm gearset including a worm gear fixed to said carrier and a worm meshed with said worm gear;

a variable speed motor operable to rotatably drive said worm;

an output shaft;

a planetary gearset including a sun gear driven by said intermediate shaft, an annulus gear driving said output shaft, and a planet carrier rotatably supporting pinion gears that are meshed with said sun gear and said annulus gear;

a shift collar mounted for rotation with said planet carrier of said planetary gearset and axial movement between a first and second positions, said shift collar is operable in its first position to couple said planet carrier to said drive annulus for establishing a forward drive connection between said intermediate shaft and said output shaft, and said shift collar is further operable in its second position to couple said planet carrier to a non-rotary member for establishing a reverse drive connection between said intermediate shaft and said output shaft; and a control system for controlling variable speed actuation of said motor to continuously vary a speed ratio between said input shaft and said intermediate shaft.

18. The transmission of claim 17 wherein said worm gearset is self-locking to prevent rotation of said planet carrier when said motor is off.

19. The transmission of claim 17 wherein said control system includes sensors for detecting operational characteristics of the motor vehicle, and a controller for receiving input signals from said sensors and controlling variable actuation of said motor in response thereto.

20. The transmission of claim 17 wherein said worm gear is an enveloping worm gear having less than twenty four teeth.

* * * * *